March 3, 1953     P. A. CALZOLARI     2,630,258
BEVERAGE CARRIER WITH DETACHABLE TRAY
Filed Aug. 15, 1950
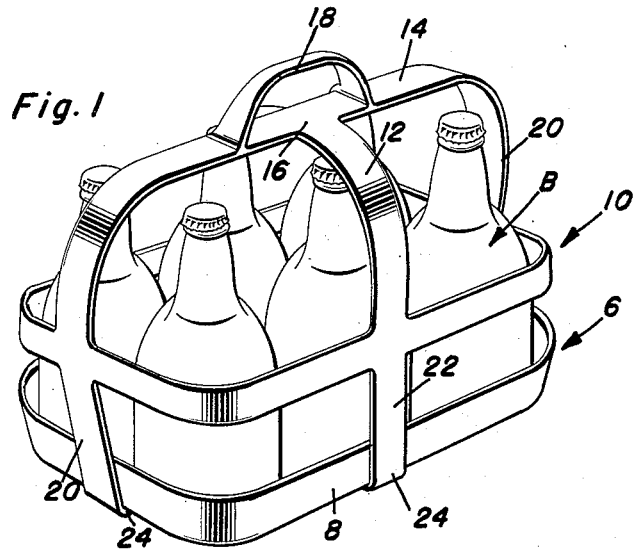
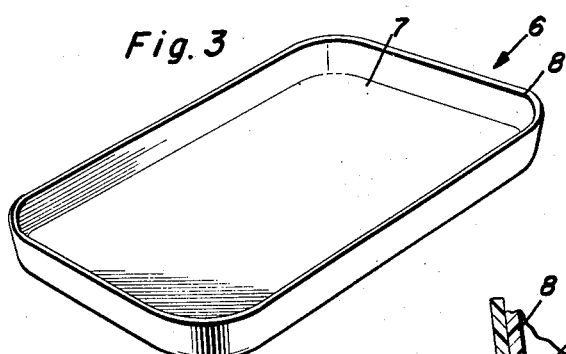
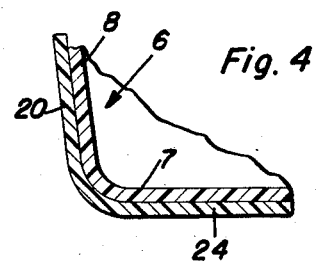
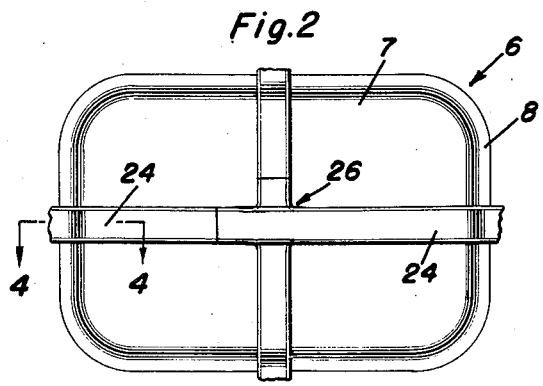
Peter Angelo Calzolari
*INVENTOR.*
BY *Thomas A. O'Brien
and Harvey B. Jacobson*
Attorneys Patented Mar. 3, 1953

2,630,258

UNITED STATES PATENT OFFICE 2,630,258

BEVERAGE CARRIER WITH DETACHABLE TRAY

Peter Angelo Calzolari, Waterville, Maine

Application August 15, 1950, Serial No. 179,563

1 Claim. (Cl. 224—46)

The present invention relates to certain new and useful improvements in beverage bottle holders and carriers and has more particular reference to a type of carrier which is adapted to facilitate the packaging and sale of bottled goods, the package constituting a satisfactory carrier for convenient transportation of said bottle goods from a store to the purchaser's home.

Needless to say, the art to which the invention relates is active and highly well developed. Many and varied styles and forms of carriers have been brought into use of late and some of the carriers are of inexpensive disposable stock and are adapted to be thrown away. Others are fairly permanent in type and are therefore used over and over. The instant invention deals with a slightly different type of carrier which is characterized by a substantial tray which is such that it may be salvaged and used indefinitely in the purchaser's home and elsewhere.

More specifically, the invention has to do with a substantial tray in which a plurality of bottles are systematically racked, said tray being provided with an open work cage structure which corrals and maintains the bottles systematically in the tray and also provides convenient handle means. The stated cage structure, as a unit, may be detached from the tray, then serving as a token or gift, employed not only for serving drinks but, if desired, reserved and utilized as a permanent serving tray to the benefit of the purchaser.

In carrying out the principles of the invention, a substantially rectangular tray of appropriate size and materials is provided and this may be either a throw away type or one which may be used over and over because of the material of which it is made. The handle unit is of basket-like or open cage form and completely encloses and guards and retains the bottles in the tray from the time they leave the place of sale and until they are removed for use. The handle unit includes members which have end portions which underlie and are detachably connected, in any suitable manner, to the bottom of the tray. By severing the overlapping connections one unit may be detached from the other and the gift tray retained thus used as desired.

Other objects and advantages will become more readily apparent from the following description and the accompanying illustrative drawings.

In the drawings:

Figure 1 is a perspective view of a combination tray and bottle carrier of the class herein shown and described;

Figure 2 is a bottom plan view of the structure seen in Figure 1;

Figure 3 is a perspective view of the tray per se; and

Figure 4 is an enlarged fragmentary section on the line 4—4 of Figure 2, looking in the direction of the arrows.

Referring to the tray unit per se in Figure 3 this unit is denoted by the numeral 6. It is of general rectangular form and includes a flat bottom 7 and a surrounding marginal retaining rim 8. The tray may be of disposable cardboard or the like or, by preference, may be of commercial plastics so that it will be susceptible of being used over and over once it is severed and detached from the disposable handle unit 10. The latter is of open basket-like construction and comprises a sort of a cage including pair of right angularly disposed and interconnected U-shaped members 12 and 14 which are joined together at 16 and provided here with an appropriate hand grip 18. All of the limb portions or arms 20—20 and 22—22 have their lower ends laterally directed as at 24 and disposed beneath in somewhat cruciform arrangement and temporarily glued or otherwise fastened, as at 26, to the bottom 7.

In practice, the capped bottles are placed in the tray and the handle unit or means 10 is then attached and secured whereby to provide a convenient light-weight and durable bottle and carrier. When the purchaser arrives home with the package she will pry the overlapped terminal ends of the end portions 24 apart and will detach the unit 10 from the unit 6 thus leaving the unit 6 to be employed as a serving tray. It may be used in serving bottles which were previously removed from the package or be used for serving sandwiches or in other ways customary in one's home.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

For use in systematically packaging and thereafter carrying bottled goods and adapted, after carrying service, to provide a purchaser with a handy serving tray for home use, a permanent tray constructed of substantially rigid material, such as commercial plastics, said tray being shallow and having a flat imperforate bottom and an upstanding marginal rim surrounding the bottom, said rim being of small vertical height and said tray being constantly open at its top, and an open cage construction embodying a first U-shaped member disposed transversely in respect to the central portion of said tray, and having its bight portion arching over the open top of the tray and having arm portions with terminals underlying the bottom of the tray and adhesively attached to the tray for separation therefrom, a complemental longitudinally disposed U-shaped member having its intermediate portion arching over the open top of the tray and the center thereof joined at right angles to the corresponding center of the first named U-shaped member and having the terminals of its arm portions underlying the bottom of the tray and adhesively joined to said tray, whereby upon separating said terminal portions from the tray the latter is then free to function as the as the aforementioned multipurpose serving tray.

PETER ANGELO CALZOLARI.

REFERENCES CITED

The following references are of record in the file of this patent:

UNITED STATES PATENTS

| Number | Name | Date |
|---|---|---|
| 1,073,691 | Lane | Sept. 23, 1913 |
| 2,152,933 | Talbot | Apr. 4, 1939 |
| 2,320,315 | Turner | May 25, 1943 |
| 2,361,926 | Brogden | Nov. 7, 1944 |
| 2,433,676 | Ringler | Dec. 30, 1947 |